(12) United States Patent
Floury et al.

(10) Patent No.: US 11,044,216 B2
(45) Date of Patent: Jun. 22, 2021

(54) METHOD AND DEVICE FOR PROCESSING A MULTIMEDIA OBJECT

(71) Applicant: Orange, Paris (FR)

(72) Inventors: Cédric Floury, Perros Guirec (FR); Violaine Mercier, Pleumeur Bodou (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/311,632

(22) PCT Filed: Jun. 23, 2017

(86) PCT No.: PCT/FR2017/051684
§ 371 (c)(1),
(2) Date: Dec. 19, 2018

(87) PCT Pub. No.: WO2017/220947
PCT Pub. Date: Dec. 28, 2017

(65) Prior Publication Data
US 2019/0253373 A1    Aug. 15, 2019

(30) Foreign Application Priority Data

Jun. 24, 2016 (FR) ...................... 1655928

(51) Int. Cl.
*H04L 12/58* (2006.01)
*H04M 1/67* (2006.01)
(Continued)

(52) U.S. Cl.
CPC .......... *H04L 51/10* (2013.01); *G06K 9/00255* (2013.01); *H04L 51/063* (2013.01); *H04L 51/066* (2013.01); *H04M 1/67* (2013.01); *H04M 1/7243* (2021.01); *H04M 1/72454* (2021.01); *H04M 2250/52* (2013.01)

(58) Field of Classification Search
CPC .. H04L 51/10; H04L 51/063; H04M 1/72569; H04M 1/72547; H04M 2250/52
See application file for complete search history.

(56) References Cited

U.S. PATENT DOCUMENTS 5,550,928 A    8/1996  Lu et al.
2013/0250034 A1*  9/2013  Hyunho et al.

FOREIGN PATENT DOCUMENTS

EP    2 642 729 A1    9/2013
EP    2642729 A1 *    9/2013    ........ H04M 1/72569

OTHER PUBLICATIONS

International Search Report and Written Opinion dated Oct. 24, 2017 for Application No. PCT/FR2017/051684.

* cited by examiner

*Primary Examiner* — Kyung H Shin
(74) *Attorney, Agent, or Firm* — Knobbe, Martens, Olson & Bear, LLP

(57) ABSTRACT

A method is described for processing a multimedia object sent by a sender device and received by a recipient device, the method implemented by the recipient device. The method includes obtaining at least one visual or audio representation of a neighborhood of the recipient device acquired during an opening of the multimedia object on the recipient device; extracting the representation of at least one item of information about users who may have had access to a content of the multimedia object during its opening on the recipient device; and dispatching said at least one item of information to the sender device.

18 Claims, 2 Drawing Sheets

(51) Int. Cl.
*H04M 1/7243* (2021.01)
*H04M 1/72454* (2021.01)
*G06K 9/00* (2006.01)

METHOD AND DEVICE FOR PROCESSING A MULTIMEDIA OBJECT

RELATED APPLICATIONS

This application is the U.S. National Phase of Application No. PCT/FR2017/051684 entitled "METHOD AND DEVICE FOR PROCESSING A MULTIMEDIA OBJECT" and filed Jun. 23, 2017, which claims the benefit of French Patent Application No. 1655928, filed Jun. 24, 2016, each of which is incorporated by reference in its entirety.

BACKGROUND OF THE INVENTION

The invention pertains to the general field of telecommunications.

It relates more particularly to the exchange of multimedia objects (i.e. of content) between a plurality of users via a telecommunications network. There is no limit attached to the nature of the multimedia objects that are exchanged: they may be any type of multimedia content such as texts, photographs, videos, music, etc.

Nowadays, with the increasing growth of mobile terminals and other digital tablets, users are exchanging large amounts of personal data or, more generally, large numbers of multimedia objects or content (photographs, texts, etc.) via telecommunications networks. To this end, there are for example numerous messaging applications (SMS (short message service), MMS (multimedia message service), instant messaging, electronic messaging, etc.), using which users are able to send multimedia objects to one or more recipients.

In the prior art, when a user A sends a message to a user B containing a photograph, for example, it is possible for user A to have confirmation that the message has been seen on a terminal of user B: "seen" is understood to mean, in the prior art, that the messaging application has been opened on a terminal of user B in order to display the message. This confirmation takes for example the form of a distinctive sign or symbol (for example a double tick) that is displayed in the messaging application of user A in respect of the reception of the message sent to user B.

However, user A, in spite of the presence of this sign or symbol, does not know who has actually had access to his message on the terminal of user B.

OBJECT AND SUMMARY OF THE INVENTION

The invention makes it possible in particular to mitigate this drawback by proposing a method for processing a multimedia object sent by a sending device and received by a recipient device, this method being intended to be implemented by the recipient device and comprising:
- a step of obtaining at least one visual or audio representation of surroundings of the recipient device, acquired when the multimedia object is opened on the recipient device;
- a step of extracting, from said representation, at least one item of information regarding users liable to have had access to content of the multimedia object when it was opened on the recipient device; and
- a step of sending said at least one item of information to the sending device.

In correlation, the invention also targets a device, called recipient device, comprising:
- a module for receiving a multimedia object sent by a sending device;
- an obtaining module, configured to obtain at least one visual or audio representation of surroundings of the recipient device, acquired when the multimedia object is opened on the recipient device;
- an extraction module, configured to extract, from said representation, at least one item of information regarding users liable to have had access to content of the multimedia object when it was opened on the recipient device; and
- a module for sending said at least one item of information to the recipient device.

The invention therefore proposes to trigger, when a multimedia object sent by a sending user via his terminal or via any other appropriate sending device (for example a server when the sending user is a content provider, for example video provider) is opened on the terminal or any other appropriate device of the recipient user of the multimedia object, the acquisition of a visual representation, in other words of an image (for example video or photograph), and/or of an audio representation (recording) of surroundings of the terminal. There is no limitation attached to the nature of the representation thus acquired, nor to the nature of the multimedia object (message or text, photograph, video, music, etc.). Moreover, a sending user, in the remainder of the description, may indiscriminately denote a physical or moral person, or any other entity able to provide multimedia content or objects to a recipient user.

The representation acquired according to the invention advantageously makes it possible to capture, at the moment when the multimedia object is opened, information regarding the users present in the proximity of the device of the recipient user and who are liable to have had access to the content of the multimedia object at the same time as the recipient user. More precisely, according to the invention, analyzing the representation thus acquired makes it possible to extract information regarding the people (users) liable to have had access to the content of the multimedia object and to transmit this information to the sender of the multimedia object so that he is informed of the physical people who have actually had access to this object.

It is noted that various levels of information may form the subject of feedback to the sending user. Thus, said at least one item of information may in particular comprise at least one item of information from among:
- a number of users liable to have had access to the content of the multimedia object when it was opened;
- names of the users liable to have had access to the content of the multimedia object when it was opened;
- when said representation is a visual representation of the surroundings of the recipient device, images of the users or faces of the users liable to have had access to the content of the multimedia object when it was opened.

The invention therefore proposes a very simple method that allows the sender of a multimedia object to have representative feedback regarding the people who have had access to this multimedia object and have seen the data transmitted in this object. Of course, it is possible to contemplate other types of information regarding the viewing context of the object extracted from the visual or audio representation of the surroundings of the recipient device when the multimedia object was opened.

The method according to the invention may advantageously utilize sensors that are already present or positioned on the device (for example terminal) of the recipient user, such as for example a camera or a video camera, that are able to acquire at least one image of the users facing the recipient device when the message is opened, and/or another microphone that is conventionally fitted to modern mobile terminals.

This makes the invention very simple to implement on existing terminals or other communication devices.

As a variant, the visual or audio representation of the surroundings of the recipient device may be acquired by way of a sensor external to the recipient device and transmitted to the recipient device via a data link or a telecommunications network.

For example, it is possible to contemplate embedding such a sensor in a connected object, triggered when the multimedia object is opened and able to send back, to the recipient device, the visual or audio representation that it has acquired. Of course, this sensor will be configured and oriented so as to allow the acquisition of a representation of the users liable to have access to the multimedia object.

In one particular embodiment in which said representation is a visual representation, the processing method comprises, in the extraction step, identifying faces present in the visual representation, said at least one extracted item of information comprising a number of faces present and identified in the visual representation and belonging to the users liable to have had access to the content of the multimedia object when it was opened.

This embodiment hinges on a simple identification of the faces existing in the visual representation. It does not require facial recognition of the users, so to speak; just enumeration of the faces present in the visual representation is sought. This is enough to allow the sending user to determine whether or not the recipient user was alone when the multimedia object was opened and detect whether people other than the recipient user have had access to this multimedia object at this moment.

In another embodiment in which said representation is a visual representation, the processing method comprises, in the extraction step, identifying faces present in the visual representation, said at least one extracted item of information comprising an image of each face present and identified in the visual representation and belonging to a user liable to have had access to the content of the multimedia object when it was opened.

The item of information reported to the sending user in this embodiment relates not only to the number of people who have had access to his multimedia object, but also to the identity of these people via the images of their faces fed back to the sending user. The item of information obtained by the user regarding the viewing context of his multimedia object is thus more complete.

As mentioned above, the invention is not limited to a visual representation of the surroundings of the recipient device, such as for example a photograph or a video.

In another embodiment, said representation is an audio representation and the processing method comprises, in the extraction step, identifying distinct voices present in the audio representation, said at least one extracted item of information comprising a number of distinct voices present in the audio representation and belonging to the users liable to have had access to the content of the multimedia object when it was opened.

It is also possible to contemplate using, according to the invention, a visual representation and an audio representation, either to cross-check the information extracted from these representations or to provide more complete information to the sending user.

In one particular embodiment, the extraction step comprises determining a number of users liable to have had access to the content of the multimedia object when it was opened, and all or some of the multimedia object received by the recipient device is protected and is made accessible on the recipient device only if the determined number of users is equal to 1.

Thus, this embodiment hinges on the information obtained regarding the surroundings of the recipient device when the multimedia object is opened so as to limit access to the content of this object. More particularly, in this embodiment, the sending user is able to restrict access to his multimedia object to a single user. This has a certain benefit when the content of the multimedia object is personal and confidential.

The invention targets the processing method implemented by the recipient device and, in correlation, said recipient device, but it also relates to the method for sending a multimedia object implemented by the sending device and in particular the item of information received by this sending device in response to the multimedia object that it has sent to the recipient device.

Thus, according to another aspect, the invention also targets a method for sending a multimedia object by a sending device, comprising:
 a step of sending a multimedia object to a recipient device; and
 a step of receiving, from the recipient device, at least one item of information representative of a number of users liable to have had access to content of the multimedia object when it was opened on the recipient device, said item of information resulting from the application, by the recipient device, of a processing method such as briefly defined above to said multimedia object.

In correlation, the invention relates to a device, called sending device, comprising:
 a sending module, able to send a message to a recipient device; and
 a reception module, able to receive, from the recipient device, at least one item of information representative of a number of users liable to have had access to content of the multimedia object when it was opened on the recipient device.

As mentioned above, the item of information regarding the number of users who have had access to the content of the multimedia object when it was opened may take on an important nature for the sending user, either to ensure limited broadcasting of the content of the multimedia object, or, by contrast, to have visibility regarding the wider broadcasting of this object. Nowadays, numerous communication platforms (for example video download platform) are interested in the visibility of multimedia content broadcast on the Internet, and such an item of information may also prove useful in such a context.

In one particular embodiment, the various steps of the method for processing a multimedia object and/or the various steps of the method for sending a multimedia object are determined by computer program instructions.

As a result, the invention also targets a computer program on an information medium, this program being able to be implemented in a (recipient or sending) device or more generally in a computer, this program including instructions designed to implement the steps of a method for processing a multimedia object and/or the steps of the method for sending a multimedia object such as described above.

Each of the abovementioned programs may use any programming language and be in the form of source code, object code, or of intermediate code between source code and object code, such as in a partially compiled form, or in any other desirable form.

The invention also targets a computer-readable information or recording medium including instructions of a computer program such as mentioned above.

The information or recording medium may be any entity or device capable of storing the program. For example, the medium may include a storage means, such as a ROM, for example a CD-ROM or a microelectronic circuit ROM, or else a magnetic recording means, for example a floppy disk or a hard disk.

On the other hand, the information or recording medium may be a transmissible medium such as an electrical or optical signal, which is able to be routed via an electrical or optical cable, by radio or by other means. The program according to the invention may in particular be downloaded from an Internet network.

As an alternative, the information or recording medium may be an integrated circuit into which the program is incorporated, the circuit being designed to execute or to be used in the execution of the method in question.

According to another aspect, the invention also targets a communications system, comprising:

a sending device; and a recipient device according to the invention;

the sending device being able to send a multimedia object to the recipient device.

In one particular embodiment, the sending device is in accordance with the invention.

The system benefits from the same advantages as the method for processing a multimedia object and the recipient device.

It is also possible to contemplate, in other embodiments, the method for processing a multimedia object, the recipient device, the method for sending a multimedia object, the sending device and the communications system according to the invention having all or some of the abovementioned features in combination.

BRIEF DESCRIPTION OF THE DRAWINGS

Other features and advantages of the present invention will emerge from the description given below, with reference to the appended drawings which illustrate one exemplary embodiment thereof, without being in any way limiting. In the figures.

DETAILED DESCRIPTION OF THE INVENTION

Figure 1:
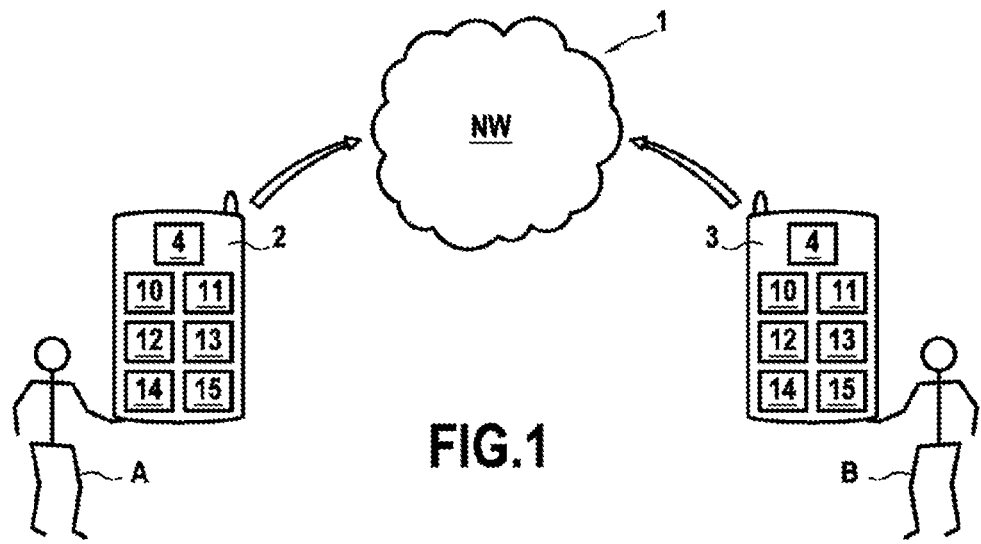
FIG. 1 shows, in its environment, a communications system according to the invention, in one particular embodiment.

FIG. 1 shows, in its environment, a communications system 1 according to the invention, in one particular embodiment. In the example contemplated in FIG. 1, the communications system 1 oversees the exchanges of messages that are or are not conveying multimedia content between a user A and a user B via a telecommunications network NW. These messages constitute multimedia objects within the meaning of the invention.

However, there is no limitation attached to the nature of the multimedia objects that are exchanged between the two users (for example messages, images, photographs, plain text, videos, etc.), nor, when this is the case, to the nature of the messages conveying these objects. These may be for example SMS, MMS, instant messaging, electronic messages, etc. It is noted that the multimedia objects may be exchanged directly between the two users A and B without resorting to a message. This is the case for example when user A is a video download platform and user B is an individual downloading content from this platform.

To this end, the communications system 1 hinges on:

a device 2 of user A, according to the invention; and a device 3 of user B, according to the invention.

The devices 2 and 3 are terminals in this case. However, depending on the application context contemplated for the invention, other communication devices may be considered, such as for example a server, a services platform, etc.

By way of illustration, we are interested in this case in a message sent by user A via his terminal 2, called sending terminal, to user B on his terminal 3, then called recipient terminal. Of course, however, the invention also applies to the messages sent by user B via his terminal 3 to user A on his terminal 2. The terminals 2 and 3 may indiscriminately be sending terminal and recipient terminal, in other words, in the context of the invention, sometimes implement a method for sending a message according to the invention and sometimes implement a method for processing a message according to the invention.

There is no limitation attached to the nature of the terminals 2 and 3 that are used by users A and B, respectively. This may involve mobile or fixed terminals, telephones, digital tablets, computers, etc. However, it is assumed in this case that the terminals 2 and 3 are each equipped with at least one image sensor 4, such as a camera or a video camera, positioned for example at the top of the terminal and on the front face thereof (i.e. the face on which the screen is situated) and able to acquire photographs or video images of surroundings of the terminal facing the terminal. Such photographs or video images constitute visual representations of the surroundings of the terminal within the meaning of the invention. Such an image sensor 4 is nowadays commonly fitted on user terminals and is not described in more detail here.

The terminals 2 and 3 may furthermore be equipped with other types of sensor, such as for example a microphone (not shown), able to acquire recordings of the audio environment of the terminals.

Figure 2:
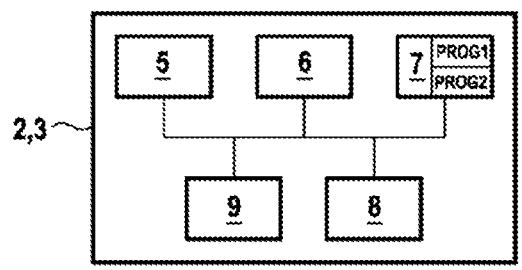
FIG. 2 schematically shows the hardware architecture of the sending and receiving devices of the communications system of FIG. 1, in one particular embodiment.

Each of the terminals 2 and 3 in this case moreover has the hardware architecture of a computer, such as shown in FIG. 2.

It comprises in particular a processor 5, a random-access memory 6, a read only memory 7, a non-volatile flash memory 8 and communication means 9 enabling it in particular to communicate on the network NW. Depending on the nature of this network, the communication means 9 comprise a SIM (subscriber identity module) or USIM (universal subscriber identity module) card, a network card, etc.

The read only memory 7 of the terminal constitutes a recording medium according to the invention, able to be read by the processor 5 and on which two computer programs PROG1 and PROG2 according to the invention are recorded in this case.

The computer program PROG1 defines functional and software modules in this case, which are configured to implement the steps of the method for sending a multimedia object according to the invention. These functional modules hinge on and/or command the abovementioned hardware elements 5-9 of the terminal. They comprise in particular in this case, as illustrated in FIG. 1:

- a multimedia object sending module 10, able to send a multimedia object (message in this case) to a recipient terminal; this module 10 hinges in particular on the communication means 9 of the terminal and on one or more messaging applications that are in this case installed on the terminal (for example applications for composing SMS, MMS, instant or electronic messaging, etc.); and
- an information reception module 11, able to receive, from the recipient terminal, information extracted by the recipient terminal from visual representations, in this case of its surroundings when the multimedia object sent by the sending module 10 is opened on the recipient terminal. The nature of this information is detailed further below. The reception module 11 also hinges on the communication means 9 of the terminal.

Similarly, the computer program PROG2 defines functional and software modules in this case, which are configured to implement the steps of the method for processing a multimedia object according to the invention. These functional modules hinge on and/or command the abovementioned hardware elements 5-9 of the terminal as well. They comprise in particular in this case, as illustrated in FIG. 1:

- a multimedia object (messages in this case) reception module 12, able to receive a multimedia object sent by a sending terminal, in particular via the telecommunications network NW. This module 12, like the module 10, hinges partly on the communication means 9 of the terminal, and on one or more messaging applications that are in this case installed on the terminal;
- an obtaining module 13, configured in this case to obtain at least one visual representation of surroundings of the recipient terminal acquired when the multimedia object is opened on the recipient terminal. In the embodiment described here, the module 13 is able to trigger the image sensor 4 of the terminal in order to obtain said visual representation;
- an extraction module 14, configured to extract, from the representation thus obtained, at least one item of information regarding users liable to have had access to content of the multimedia object when it was opened on the recipient terminal; and
- a module 15 for sending the extracted item(s) of information to the recipient terminal. The module 15 hinges in particular on the communication means 9 of the terminal.

The functions of these various modules are now described in further detail, with reference to the steps of the method for sending a multimedia object (a message in this case) and to the steps of the method for processing a multimedia object according to the invention, implemented by the terminals 2 and 3, respectively, in the chosen exemplary illustration.

Figure 3:
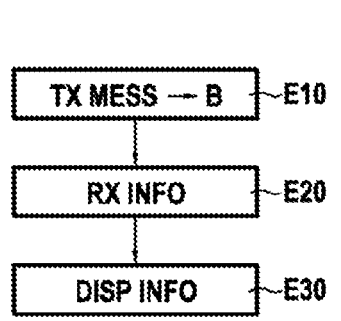
FIG. 3 illustrates the main steps of a method for sending a multimedia object according to the invention in the form of a flowchart.
Figure 4:
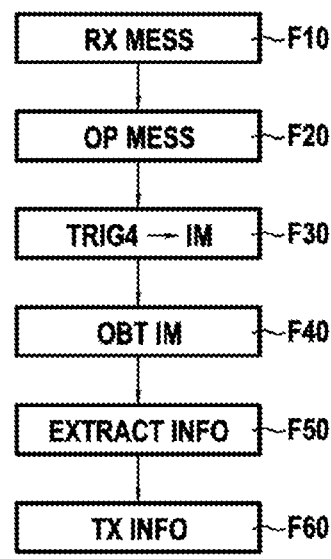
FIG. 4 illustrates the main steps of a method for processing a multimedia object according to the invention in the form of a flowchart.

FIG. 3 shows the main steps of the method for sending a multimedia object as they are implemented, in one particular embodiment, by the terminal 2. FIG. 4 shows the main steps of the method for processing a multimedia object, implemented by the terminal 3 according to the invention, upon reception of the multimedia object sent by the terminal 2.

With reference to FIG. 3, it is assumed that user A launches a messaging application (for example instant messaging or SMS) on his terminal 2, and composes a message MESS destined for user B in this messaging application. This message contains one or more items of multimedia content, such as for example text, a photo, etc. As mentioned above, the message MESS constitutes a multimedia object within the meaning of the invention.

The terminal 2, via its sending module 10 and its communication means 9 for communicating on the telecommunications network NW, sends the message MESS to the terminal 3 of user B via the network NW (step E10).

With reference to FIG. 4, the terminal 3 of user B, by way of its reception module 12 and its communication means 9 for communicating on the telecommunications network NW, receives the message MESS sent by user A (step F10).

The module 12 notifies user B of the terminal 3 of the reception of a new message, for example by emitting a sound or displaying an icon on the screen of the terminal 3.

It is assumed that, following this notification, user B launches his messaging application in order to open the message MESS received from user A, for example by clicking on the new received message once the application has been launched (step F20).

According to the invention, the opening of the message MESS by the terminal 3 triggers the sending, by the obtaining module 13, of a command to the image sensor 4 of the terminal 3 so that said image sensor acquires at least one digital image IM (or even a plurality of digital images, for example in the case of a video camera) of the surroundings of the terminal 3 at the moment when the message MESS is opened (step F30). On account of the position and of the configuration of the image sensor 4 on the terminal 3, the surroundings thus captured comprise the various people (users) facing the terminal 3 with user B at the moment when the message MESS is opened by said user. These various people are therefore liable to have access to the content of the message MESS at the same time as user B. Such an image IM constitutes a visual representation of the surroundings of the terminal 3 when the message MESS is opened on this terminal.

The image IM acquired by the image sensor 4 is transmitted to the obtaining module 13, which in turn transmits it to the extraction module 14 of the terminal 3 for processing (step F40).

According to the invention, the extraction module 14 extracts, from the image IM, various information regarding the users liable to have had access to the content of the message MESS when it was opened by user B on the terminal 3 (step F50). More particularly, in the embodiment described here, the extraction module 14 implements an algorithm for identifying the faces present in the image IM. Such an algorithm makes it possible to identify, in a scene shown in a digital image, one or more human faces. Such face identification algorithms are known per se (genetic algorithms, Viola and Jones method, etc.) and described for example in the document available at the URL https://facedetection.com/algorithms. There is no limitation attached to the algorithm used by the extraction module 14 to identify the various faces present in the image IM.

It is noted that it is not necessary, in the embodiment described here, for the algorithm used by the extraction module 14 to allow these faces to be recognized, in other words to associate them with one person in particular. In the embodiment described here, it is more important to identify the various faces present in the digital image IM for the purpose of enumerating them. The number of faces identified by the extraction module 14 in the digital image IM is denoted CNT.

Figure 5:
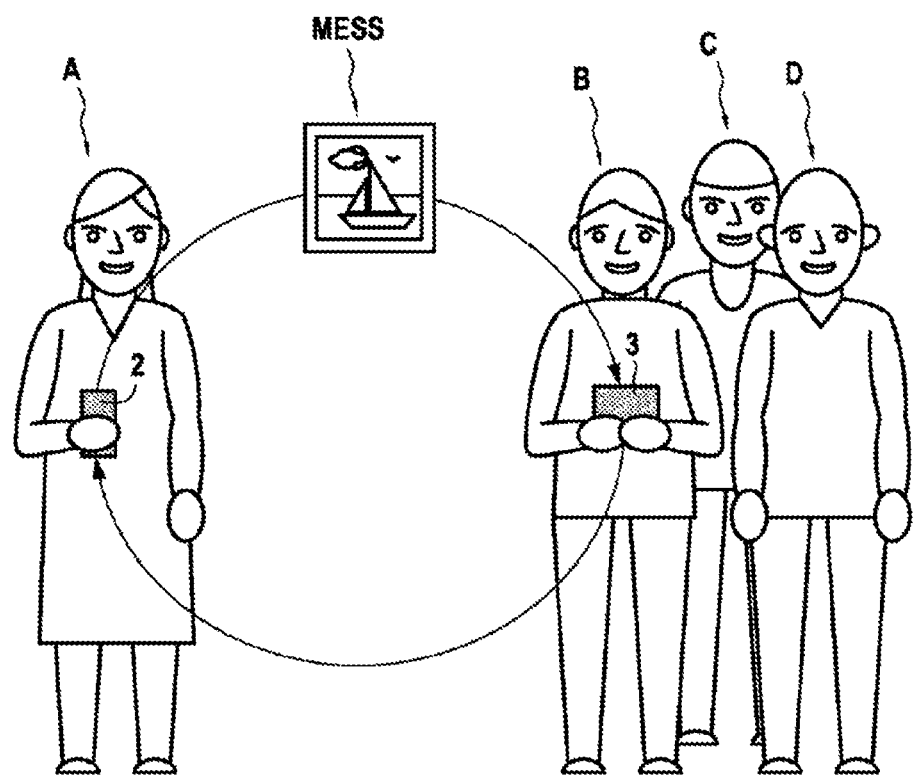
FIG. 5 shows an illustrative example of the implementation of the invention by the communications system of FIG. 1.
Figure 5:
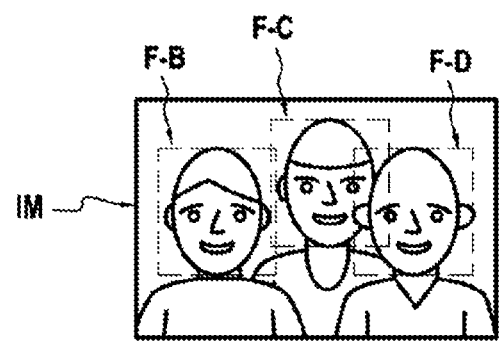

FIG. 5 illustrates the application of the invention by way of an example. According to this example, user B is in the company of two other users C and D when he receives and opens the message MESS sent by user A. The image IM acquired by the terminal 3 when the message is opened shows the three users B, C and D. The application of the face identification algorithm by the extraction module 14 to the digital image IM obtained from the image sensor 4 makes it possible to extract the three faces F_B, F_C and F_D of users B, C and D, respectively. The extraction module 4 therefore counts CNT=3 faces in the digital image IM in this example. This means that three people are liable to have had access to the message MESS when it was opened on the terminal 3 of user B.

In the embodiment described here, the extraction module 14 furthermore extracts, from the image IM, during step F50, an image of each of the faces identified in the digital image IM. The three images thus extracted in the example illustrated in FIG. 5 are denoted IM(F_B), IM(F_C) and IM(F_D).

It is noted that, in the example illustrated in FIG. 5, the three users B, C and D are facing the terminal 3 when the message MESS is opened, thereby simplifying the analysis of the digital image IM for the purpose of identifying the number of users liable to have had access to the message when it was opened. Of course, depending on the viewing context of the message MESS, some users may be oriented differently in the digital image IM. One appropriate configuration of the extraction module 14 makes it possible to decide, depending on the orientation of the people present in the image IM, whether or not they have had access to the message and whether or not to count them among the people liable to have had access to the message. For example, if some detected faces are side-on with respect to the plane of the digital image IM, it may be assumed that the people associated with these faces did not have access to the content of the message MESS when it was opened.

In another embodiment, the extraction module 14 implements a facial recognition algorithm, for example using photos of users B, C and D that are stored in the terminal 3, in its index or contacts address book. In this way, the extraction module 14 is able to associate the name of a user with all or some of the faces detected in the digital image IM.

Following the identification of the faces present in the image IM and the counting of the faces thus identified, the information sending module 15 of the terminal 3 sends, to the terminal 2, in a message RESP sent on the telecommunications network NW, the information that it has extracted from the image IM regarding the users liable to have had access to the content of the message MESS when it was opened on the terminal 3 (step F60). In the embodiment described here, this information comprises:

the number CNT (=3 in the example of FIG. 5) of users liable to have had access to the content of the message MESS; and for each of these users, the image of his face identified in the image IM (IM(F_B), IM(F_C) and IM(F_D) in the example of FIG. 5).

In the embodiment outlined above, in which facial recognition is implemented by the extraction module 14, the information transmitted to the terminal 2 may furthermore comprise the names of the users recognized by the extraction module 14 in the digital image IM.

The terminal 2 receives the message RESP via its message reception module 11 and extracts, from this message, the information received from the terminal 3 (step E20). It notifies this information to user A, for example by displaying it on the screen of the terminal 2 (step E30). User A is thus informed that three users, whose faces he is able to see, have potentially had access to the content of his message.

In the embodiment described here, the message MESS is opened and its content is accessed unconditionally on the terminal 3. In another embodiment, it may be contemplated, before sending thereof by the sending module 10 of the terminal 2, for all or some of the content of the message MESS to be protected by the sending module 10 so as to be made accessible on the terminal 3 only if the number CNT of users determined by the extraction module 14 of the terminal 3 is equal to 1 or coincides with a particular predetermined user.

To this end, the message MESS incorporates a software module making it possible to check this parameter. Such a software module is known per se and is not described in more detail here. In this embodiment, following the determination of the number CNT, the extraction module 14 provides this number to the software module embedded in the message MESS, which verifies whether the number CNT is equal to 1. Where applicable, access to the content of the message MESS protected by the software module is permitted. If not, only those parts of the content of the message MESS that are not protected are allowed to be accessed following the opening of the message MESS.

Of course, other conditions for protecting access to the content may be contemplated on the basis of the information able to be extracted from the digital image IM.

Moreover, in the embodiment described here, the digital image IM, or the digital images IM if a stream of video images is acquired by the image sensor 4, are acquired by virtue of an image sensor positioned on the terminal 3. The majority of terminals are nowadays equipped with such sensors, thereby facilitating the implementation of the invention. However, this condition is not limiting per se, and the invention may also be implemented using an image sensor external to the terminal and commanded by the obtaining module 13, that is to say triggered when the message MESS is opened on the terminal 3. Such a sensor may be integrated in particular into a connected object for example, such as for example into a webcam or any other type of device that is able to communicate with the terminal 3 so as to transmit to it the acquired image via a data link or a telecommunications network (for example short distance link or network NW). In this case, care will be taken to position the connected object incorporating the image sensor so as to be able to capture an image of the surroundings of the terminal 3 when the message MESS is opened, and such that these surroundings show the users liable to have access to the content of the message MESS on the terminal 3 when it is opened. This configuration of the connected object may comprise an appropriate orientation of the image sensor such that the image IM that is acquired is relevant to the implementation of the invention.

In the embodiment described here, we are interested in acquiring and analyzing a visual representation of the surroundings of the terminal 3 when the message MESS is opened. However, the invention also applies to an audio representation of these surroundings, that is to say typically to an audio recording made for example by way of a microphone fitted to the terminal 3 and triggered when the message MESS is opened. The analysis performed on this audio representation by the extraction module 14 then consists in identifying (or even recognizing) distinct voices present in the recording, excluding voices corresponding to background noise. There is no limitation attached to the extraction algorithm implemented by the extraction module 14 for this purpose. It may be for example a technique using hidden Markov models (or HMM).

On the basis of the voices thus extracted, the extraction module 14 deduces the number CNT of users liable to have had access to the content of the message MESS when it was opened. This number CNT is then transmitted to the terminal 2.

It is moreover noted that the invention has been described with reference to a message MESS exchanged between two physical people A and B. Of course, the invention may apply to other contexts and to other multimedia objects. Thus, for example, the invention may apply in a context in which user A is a video content provider offering videos (multimedia objects within the meaning of the invention) via a download platform (sending device within the meaning of the invention). The invention exhibits a particular benefit in this context, as it allows the video content provider to ascertain, each time a video is downloaded, how many users have actually seen this video.

The invention claimed is:

1. A method for processing a multimedia object sent by a sending device and received by a recipient device, the method implemented by the recipient device, the method comprising:
   receiving a multimedia object from the sending device;
   obtaining at least one visual or audio representation of surroundings of the recipient device, the obtaining of the at least one representation being triggered when the received multimedia object is opened on the recipient device;
   extracting, from the representation, at least one item of information regarding at least one user likely to have had access to content of the multimedia object when the multimedia object was opened on the recipient device; and
   sending to the device sending the multimedia object, the extracted at least one item of information regarding at least one user likely to have had access to content of the multimedia object when the multimedia object was opened on the recipient device.

2. The method of claim 1, wherein the at least one item of information comprises at least one item of information from among:
   a number of users likely to have had access to the content of the multimedia object when the multimedia object was opened;
   names of the users likely to have had access to the content of the multimedia object when the multimedia object was opened; and
   when the representation is a visual representation of the surroundings of the recipient device, images of the users or faces of the users likely to have had access to the content of the multimedia object when the multimedia object was opened.

3. The method of claim 1, wherein the representation is a visual representation, and wherein extracting at least one item of information comprises identifying faces present in the visual representation, the at least one extracted item of information comprising a number of faces present and identified in the visual representation and belonging to the users likely to have had access to the content of the multimedia object when the multimedia object was opened.

4. The method of claim 1, wherein the representation is a visual representation, and wherein extracting at least one item of information comprises identifying faces present in the visual representation, the at least one extracted item of information comprising an image of each face present and identified in the visual representation and belonging to a user likely to have had access to the content of the multimedia object when the multimedia object was opened.

5. The method of claim 1, wherein the representation is an audio representation, and wherein extracting at least one item of information comprises identifying distinct voices present in the audio representation, the at least one extracted item of information comprising a number of distinct voices present in the audio representation and belonging to the users likely to have had access to the content of the multimedia object when the multimedia object was opened.

6. The method of claim 1, wherein extracting at least one item of information comprises determining a number of users likely to have had access to the content of the multimedia object when it was opened, and wherein all or some of the multimedia object received by the recipient device is protected and is made accessible on the recipient device only if the determined number of users is equal to 1.

7. The method of claim 1, wherein the visual or audio representation is acquired using a sensor positioned on the recipient device.

8. The method of claim 7, wherein the sensor is a camera or a video camera capable of acquiring at least one image of the users facing the recipient device when the multimedia content is opened.

9. The method of claim 1, wherein the visual or audio representation is acquired using a sensor external to the recipient device and transmitted to the recipient device via a data link or a telecommunications network.

10. A method for sending a multimedia object a sending device, the method comprising:
    sending a multimedia object to a recipient device; and
    receiving, from the recipient device, at least one item of information representative of a at least one user likely to have had access to content of the multimedia object when the multimedia object was opened on the recipient device, the item of information resulting from the implementation, by the recipient device, of the method of claim 1 with respect to the multimedia object.

11. A computer having stored thereon instructions which when executed by the computer, cause the computer to implement the method of claim 10.

12. A non-transitory computer readable data medium having stored thereon instructions, which when executed by a processor, cause the processor to implement the method of claim 10.

13. A computer having stored thereon instructions, which when executed by the computer, cause the computer to implement the method of claim 1.

14. A non-transitory computer-readable recording medium having stored thereon instructions, which when executed by a processor, cause the processor to implement the method of claim 1.

15. The method of claim 1, wherein the recipient device is a mobile terminal.

16. A recipient device comprising a processor, the recipient device configured to:
    receive a multimedia object sent by a sending device;
    obtain at least one visual or audio representation of surroundings of the recipient device, the obtaining of the at least one representation being triggered when the multimedia object is opened on the recipient device;

extract, from the representation, at least one item of information regarding at least one user likely to have had access to content of the multimedia object when the multimedia object was opened on the recipient device; and send to the device sending the multimedia object, the at least one item of information regarding at least one user likely to have had access to content of the multimedia object when the multimedia object was opened on the recipient device.

17. A sending device comprising a processor, the sending device configured to:

send a multimedia object to the recipient device of claim 16; and receive, from the recipient device, at least one item of information representative of at least one user likely to have had access to content of the multimedia object when the multimedia object was opened on the recipient device.

18. A communications system, comprising:

the recipient device of claim 16, and a sending device comprising a processor, the sending device configured to send a multimedia object to the recipient device.

\* \* \* \* \*